June 4, 1963 R. VINET 3,092,434
DEVICE FOR THE RECORDING OF THE REPETITION RATE OF AN EVENT
Filed Nov. 30, 1959 2 Sheets-Sheet 1

INVENTOR
RAYMOND VINET
BY Moorwand Hall
ATTORNEYS

June 4, 1963   R. VINET   3,092,434
DEVICE FOR THE RECORDING OF THE REPETITION RATE OF AN EVENT
Filed Nov. 30, 1959   2 Sheets-Sheet 2

INVENTOR
RAYMOND VINET
BY Moore and Hall
ATTORNEYS

United States Patent Office 3,092,434
Patented June 4, 1963

3,092,434
DEVICE FOR THE RECORDING OF THE REPETITION RATE OF AN EVENT
Raymond Vinet, Paris, France, assignor to Electricite de France, Service National, Paris, France, a national public utility of France
Filed Nov. 30, 1959, Ser. No. 856,099
Claims priority, application France Dec. 18, 1958
8 Claims. (Cl. 346—107)

The present invention relates to a device for measuring and recording, during a given time interval, the durations corresponding to fractions of said interval, and during which a variable physical quantity assumes definite values respectively comprised within a range between the limits of which the said physical quantity is able to oscillate and to repeatedly assume the same values during periods of time which may be constant or variable and of which the sum is to be measured. For instance if the individual periods of time during which the said physical quantity assumes different values have all the same constant value, as signals of constant duration and varying amplitude, the device according to the invention measures the rate of repetition of signals having the same amplitude; on the contrary, if said individual periods of time are also variable, for instance the periods of time during which the voltage of a network supplying energy assumes the same values during a total time interval of 24 hours or a week, the measurement results in the totalisation of said periods corresponding to each assumed value and results in the determination of the fractions of said time interval during which said voltage assumes different values respectively, such a measurement allowing useful information to be obtained.

A process for the photographic recording of the frequency of an event, particularly the reception frequency of impulses issuing from an ionization chamber is already known and consists in taking a photograph of the screen of a cathode-ray oscillograph in which the deflection of the electronic beam is controlled along an axis, the horizontal axis for instance, by a time base formed by a saw-tooth-shaped oscillation; whereas, the vertical deflection is controlled by the signal initiated by the event, taken at a moment which is a function of the signal value, a value that characterizes a parameter of the event. By taking photographs of the screen of the cathode ray tube, a kind of spectrum is obtained, which is constituted by vertical bands or stripes which are the more opaque as the repetition rate of an event characterized by a parameter value corresponding to a stripe is higher. The opacity of the successive stripes of the spectrum is then measured by known means, for instance by comparison with a reference band, corresponding to a known repetition rate.

The device according to the present invention makes it possible to obtain, by a simpler means, a photographic recording of the repetition rate of an event, without having recourse to a cathode-ray oscillograph, by using in most cases a measuring instrument of the conventional type comprising a stationary part and a movable part, a photosensitive band rigidly connected to one of said parts, a source of radiations capable of impressing said photosensitive band and rigidly connected to the other part of the measuring instrument, the said photosensitive band being arranged in such a manner that during operation the relative displacement of said radiation source with respect to said band is parallel to the surface thereof, whereby a kind of spectrum is obtained which is formed by zones of varying opacity, corresponding to different positions of said movable part of the instrument, the degree of opacity of the zones corresponding to different values of the physical quantity involved thus forming the measure of the time periods during which said values are assumed by said physical quantity respectively.

Separated means are also provided to measure the absolute or relative opacity of the various impressed ranges of the recording band.

By way of example, several forms of embodiment of the invention are described hereafter and schematically illustrated in the annexed drawing.

Figure 6:
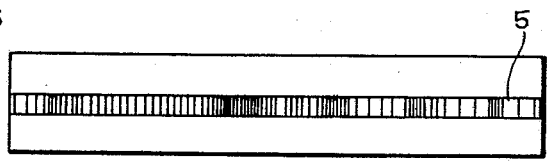
Figure 7:
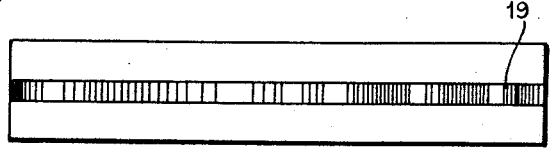
Figure 8:
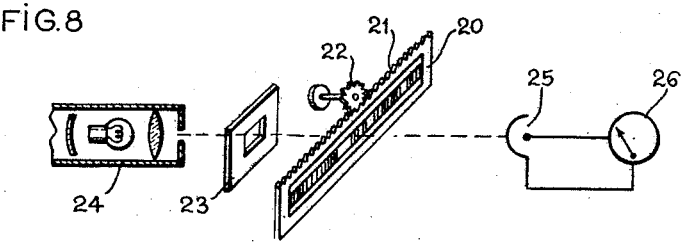

FIGURES 6 to 8 relate to another form of embodiment of the device designed to measure the opacity of the photosensitive band.

Figure 1A:
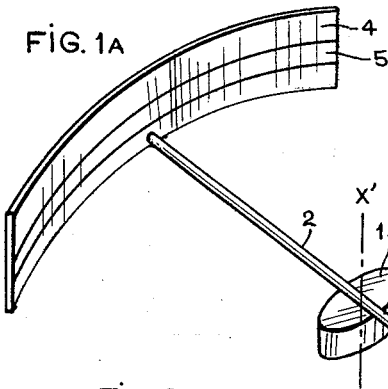
FIGURE 1a is a perspective view of a device provided with a source of radioactive radiations rigidly locked with the movable part of the measuring instrument and FIGURE 1b is a modified embodiment.

In the example illustrated in FIGURE 1a, the device is designed to record the repetition rate of the different values of the variable amplitude of a physical phenomenon capable of being translated by an electric voltage and particularly the repetition during a given time of the values of the voltage of a distribution network. The measuring instrument used includes therefore a voltmetric element 1 oscillating round the axis XX' and supporting a source of radioactive radiations constituted by a tube or gun 2 containing at its end 3 a radioactive element 3. The stationary portion of the instrument includes a cylindrical support 4 upon which can be placed by suitable means a photo-sensitive band (paper or film) 5 which is swept on all its length by the beam of radiations radiated by the gun 2 at the deflections of the element 1. The whole instrument is placed in a closed space, insulated with regard to the radiations used and made, for instance, of lead in the case of the use of γ rays and of aluminum in the case of use of β rays.

When the measuring instrument is fed with the variable voltage to be recorded, the tube 2 oscillates in function of the amplitude of this voltage and impresses the different zones of the band 5: these zones will be the more impressed and thereby become the more opaque as they correspond to the most frequent or most extended positions of the movable element 2 during the period under observation. The degree of opacity of the different zones of the band 5 indicates consequently the time during which is actually maintained each of the different values capable of being attained by the measured voltage during the given period.

Figure 1B:
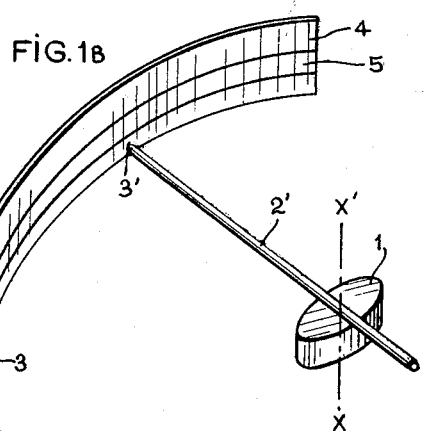
Figure 2:
FIGURE 2 shows the photosensitive recording band, after the functioning of the instrument.

FIGURE 1b shows a modified form of the device equipped with a source of radioactive radiations rigidly locked with the movable portion of the instrument; in the device, a needle 2', integral with the voltmetric element 1 bears, at its end near the photosensitive band 5, a radio-active pellet 3', as it is known for recording instruments designed to trace a curve on a movable photo-sensitive band, instead of the usual recording stylet.

Figure 3:
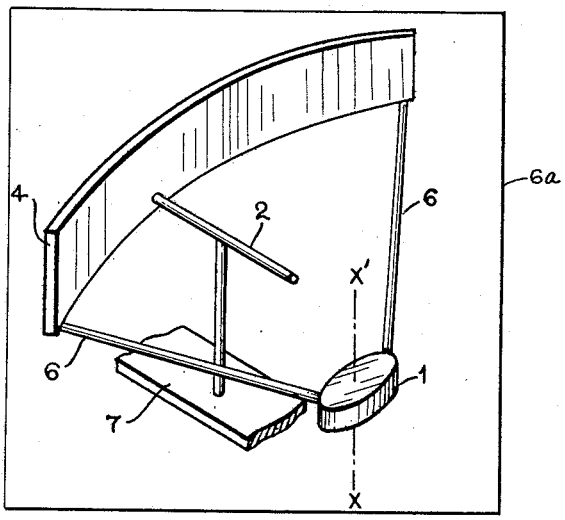
FIGURE 3 shows in perspective a device with a stationary source of radioactive radiations and a movable photosensitive band.

In the embodiment illustrated in FIGURE 3, the movable element 1 of the measuring instrument is connected with the cylindrical support 4 of the photo-sensitive band 5 by means of a support 6 whereas the gun 2 supplying radio-active radiations (or the needle 2' with its radio-active pellet 3') remains stationary and is supported for example by a piece 7 rigidly connected with the casing or the frame of the instrument, or forming a part of this casing or frame.

Figure 4:
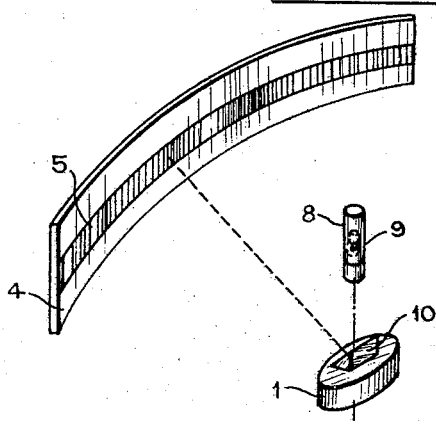
FIGURE 4 shows a device provided with a source of light radiations.

In the form of embodiment illustrated in FIGURE 4, the source of light radiations which is used is constituted by a projector 8 placed along the oscillation axis of the movable element 1 of the measuring instrument and containing a light 9 which is fed by a stabilized voltage to withdraw said light from the influence of the voltage variations. This projector sends a light beam upon a reflecting surface, a mirror or a prism, 10, fixed on the movable voltmetric element 1; the reflecting surface 10 sends back this beam on the photosensitive band 5, mounted on the stationary support 4, the whole instrument being placed in a light impervious closed space represented by radiation shield 6a.

Of course, it is also possible in this case to set free the support 4 of the band 5 by connecting it rigidly with the element 1 and to fix the prism 10 but this arrangement does not seem to be specially advantageous as the projector 8—9 remains in any case stationary thanks to its arrangement along the oscillations axis.

Figure 5:
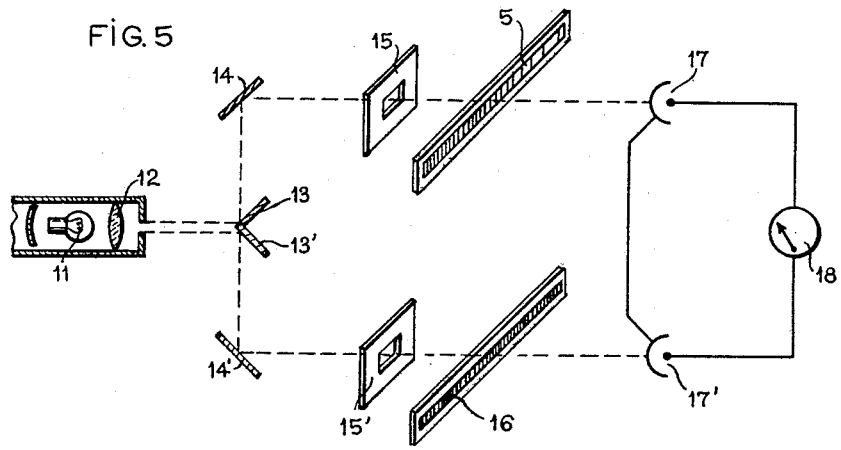
FIGURE 5 illustrates a differential device for the measurement of the opacity of the recorded photosensitive bands.

FIGURE 5 illustrates a well known apparatus which allows to obtain, from the recording photo-sensitive band having a variable opacity, the curve representing in function of the time the repetition rate of the varied values of the phenomenon under examination.

The apparatus includes a source of light 11 which sends, by means of a suitable optical system 12, a light beam upon two mirrors 13 and 13' each placed at an angle of 45°, to reflect at right angles two beams onto mirrors 14, 14' and these mirrors 14, 14' return the light through two diaphragms 15, 15', in front of the first diaphragm, the different ranges of the recording band 5 can be moved whereas in front of the diaphragm 15' is moved a comparison band 16 having ranges recorded in identical conditions, for instance with the same recording instrument, during given periods of time, one hour, two hours, three hours, or during one or two days according to the given measure period. The beams, after passing through the two bands 5, 16, are sent upon two photo-electric cells, 17, 17', mounted in opposition in the circuit of a galvanometer 18. The measurement consists in placing in front of the diaphragm 15 a zone of the band 5 and then moving the comparison band 16 in front of the diaphragm 15' until the galvanometer is brought back to balance.

In a modified embodiment illustrated in FIGURES 6 to 8, the opacity of each zone of the recorded band 5 is not compared individually with a comparison band, but the opacities of the successive zones thereof are compared with each other to obtain their relative importance. This method allows the removal of the errors which could be produced by variations of the sources of radiations from an apparatus to the other, by the sensitivity differences between the photosensitive surface and by the differences occurring in the development of these surfaces.

The principle of the instrument consists in comparing the amount of light allowed to pass through each homogeneously impressed zone of the band 5 with the sum of the amount of light allowed to pass through all the zones of said band $I_1$, $I_2$, $I_3$ . . . being the amounts of light passing through each zone and $K_1$, $K_2$, $K_3$ . . . being the correlation coefficients between the amounts of light and the corresponding times of exposure, the curve of the relative opacities, in percentage, will be obtained by calculating the ratios:

$$\frac{K_1 I_1}{\Sigma(K_1 I_1 + K_2 I_2 + \ldots K_n I_n)}$$

$$\frac{K_2 I_2}{\Sigma(K_1 I_1 + K_2 I_2 + \ldots K_n I_n)}$$

. . . . . . . . . . .

$$\frac{K_n I_n}{\Sigma(K_1 I_1 + K_2 I_2 + \ldots K_n I_n)}$$

To facilitate the measuring, the image 5 obtained on the recording band, shown in FIGURE 6, can be inverted so as to give the image 19 of FIGURE 7, to come in the sensitivity range of the photo-cells. The band 5—or the inverted band 19—is mounted on a frame which is moved by means of a rack 21 and a pinion 22 in front of the diaphragm 23, lighted by the light source 24. The light passing through the band 5 or through the inverted band 19 is received in a photocell 25 connected with a millivoltmeter 26. The signals of this voltmeter give values $I_1$, $I_2$ . . . $I_n$ proportional to the amounts of light corresponding to the successive ranges of the band 5 or of the inverted band 19.

What is claimed is:

1. In an electric measuring instrument comprising an oscillating movable element and a stationary support having a cylindrical surface coaxial with the axis of oscillations of said movable element, a photosensitive band attached to the surface of said cylindrical support, a radially extending tubular member rigidly connected to the oscillating element and having one end open and movable in front of said band, a radioactive substance arranged inside said tube near its opposite closed end, whereby during operation a spectrum is obtained on said band, which is formed by zones of varying opacity parallel to said axis of oscillations and the opacities of which correspond to the frequency of repetition of the corresponding values of the physical quantity causing the deviations of the osscillating element of the instrument, a housing made of lead and within which the whole instrument is enclosed.

2. In an electric measuring instrument comprising an oscillating movable element and a stationary support having a cylindrical surface coaxial with the axis of oscillations of said movable element, a photosensitive band attached to the surface of said cylindrical support, a radially extending member rigidly connected to the oscillating element and having its end movable in front of said band and provided with a pellet of radioactive substance, whereby during operation, a spectrum is obtained on said band, which is formed by zones of varying opacity parallel to said axis of oscillations and the opacities of which correspond to the frequency of repetition of the corresponding values of the physical quantity causing the deviations of the oscillating element of the instrument, a housing made of lead and within which the whole instrument is enclosed.

3. In an electric measuring instrument comprising a movable element formed by a cylindrical member arranged to oscillate around its geometrical axis, a stationary element arranged on said axis, a band of photosensitive material attached to said movable cylindrical member, a radially extending member rigidly connected to said stationary member having its end in the vicinity of said band and provided with a pellet of radioactive substance, whereby during operation, a spectrum is obtained on said band which is formed by zones of varying opacity parallel to said axis of oscillations and the opacities of which correspond to the frequency of repetition of the corresponding values of the physical quantity causing the deviations of the oscillating element of the instrument, a housing made of lead and within which the whole instrument is enclosed.

4. In an electric measuring instrument comprising an oscillating movable member and a stationary support having a cylindrical surface coaxial with the axis of oscillation of said movable member, a photosensitive band attached to the surface of said cylindrical support, means rigidly attached to the oscillating member to radially project an uninterrupted beam of light of constant intensity onto said photosensitive band, whereby during operation, a spectrum is obtained on said band, which is formed by zones of varying opacity parallel to said axis of oscillations and the opacities of which correspond to the frequency of repetition of the corresponding values of the physical quantity causing the deviations of the oscillating element of the instrument, a housing made of lightproof material and within which the whole instrument is enclosed.

5. A measuring instrument for recording the time-integrated values assumed by a variable physical quantity over a given measuring interval comprising: an oscillating part which is continually responsive to said physical quantity, a stationary part, a photosensitive band rigidly connected to one of said parts, a source of constant intensity radiations capable of exposing at any instant a part of said photosensitive band and being rigidly connected to said other part, said oscillating part being so mounted in relation to said stationary part that said radiations from said source at each successive instant throughout said given measuring interval impinge upon a selected portion of said band in accordance with the then-existing position of said oscillating part, whereby any particular portion of said band may repeatedly have said radiations impinging thereupon during said given measuring interval as said physical quantity repeatedly assumes a corresponding value causing said oscillating part to move to a corresponding position and the total amount of radiation impinging upon any said portion is a function of the cumulative amount of time that said physical quantity assumes the particular corresponding value throughout said given measuring interval thereby causing a continuous spectrum comprising zones of varying opacity to be formed on said band.

6. A measuring instrument for recording the time-integrated values assumed by a variable physical quantity throughout a given measuring interval comprising: a pivotally arranged oscillating part which is continually responsive to said physical quantity, a stationary part, a cylindrical support rigidly connected to one of said parts and coaxially arranged with the axis around which is pivoted the oscillating part, a photosensitive band rigidly attached to said cylindrical support, a source adapted to provide an uninterrupted emitting beam of radiations of constant intensity and rigidly connected to the other part of the measuring instrument to generate a radial beam of radiations, said oscillating and stationary parts being so mounted relative to each other as to cause said source to expose at each instant a part of said photosensitive band upon which said beam then impinges as determined by the then-existing position of said oscillating part, whereby during operation said source continually exposes selected portions of said band in accordance with the instantaneous value of said physical quantity and particular portions may be exposed in different amounts in dependence upon the cumulative amount of time that said physical quantity assumes corresponding values throughout said given measuring interval to thereby cause a spectrum to be obtained on said band which is formed by zones of varying exposure.

7. A measuring instrument according to claim 5 wherein the source of radiations is formed by a radioactive substance.

8. A measuring instrument according to claim 5, wherein the source of radiations is formed by a light projection.

References Cited in the file of this patent

UNITED STATES PATENTS

| | | |
|---|---|---|
| 1,590,452 | Sparkes | June 29, 1926 |
| 1,597,487 | St. Clair | Aug. 24, 1926 |
| 1,663,308 | Jenkins | Mar. 20, 1928 |
| 1,946,576 | Dunn et al. | Feb. 13, 1934 |
| 1,947,816 | Waite et al. | Feb. 20, 1934 |
| 1,967,895 | Marvin | July 24, 1934 |
| 2,145,591 | Fitzgerald | Jan. 31, 1939 |
| 2,206,214 | Wicker | July 2, 1940 |
| 2,656,757 | Stern | Oct. 27, 1953 |
| 2,692,948 | Lion | Oct. 26, 1954 |
| 2,726,131 | Skelton | Dec. 6, 1955 |

FOREIGN PATENTS

| | | |
|---|---|---|
| 428,554 | Germany | May 6, 1926 |
| 699,792 | Great Britain | Nov. 18, 1953 |